(12) United States Patent  
Jhu et al.

(10) Patent No.: US 10,097,419 B2  
(45) Date of Patent: Oct. 9, 2018

(54) LINEAR METHOD FOR DETECTION OF MULTIPLE SERVICE TOPOLOGIES

(71) Applicant: ALCATEL-LUCENT CANADA INC., Ottawa (CA)

(72) Inventors: Michael Jhu, Ottawa (CA); Abdur Rahman, Ottawa (CA)

(73) Assignee: ALCATEL-LUCENT CANADA, INC., Ottawa (CA)

( * ) Notice: Subject to any disclaimer, the term of this patent is extended or adjusted under 35 U.S.C. 154(b) by 103 days.

(21) Appl. No.: 15/350,939

(22) Filed: Nov. 14, 2016

(65) Prior Publication Data

US 2018/0139097 A1     May 17, 2018

(51) Int. Cl.
 *H04L 12/24*     (2006.01)
 *H04L 12/931*     (2013.01)

(52) U.S. Cl.
 CPC ............ *H04L 41/12* (2013.01); *H04L 49/354* (2013.01)

(58) Field of Classification Search
 None
 See application file for complete search history.

(56) References Cited

U.S. PATENT DOCUMENTS

| | | | | |
|---|---|---|---|---|
| 7,693,158 B1* | 4/2010 | Carrie | ................. | H04L 12/4641 370/395.53 |
| 8,392,509 B1* | 3/2013 | Klessig | ............... | H04L 41/0803 370/419 |
| 9,811,266 B1* | 11/2017 | Sun | ......................... | G06F 13/16 |
| 2003/0152075 A1* | 8/2003 | Hawthorne, III | ... | H04L 12/4641 370/389 |
| 2005/0018605 A1* | 1/2005 | Foote | ................... | H04L 12/4641 370/230 |
| 2007/0280241 A1* | 12/2007 | Verma | ................. | H04L 12/4641 370/392 |
| 2009/0168768 A1* | 7/2009 | Chiabaut | ................ | H04L 45/00 370/389 |
| 2012/0230199 A1* | 9/2012 | Chiabaut | ................ | H04L 45/12 370/238 |
| 2014/0047056 A1* | 2/2014 | Tahara | .................... | H04L 69/40 709/208 |
| 2014/0064283 A1* | 3/2014 | Balus | ...................... | H04L 49/70 370/392 |

(Continued)

*Primary Examiner* — Otis L Thompson, Jr.
(74) *Attorney, Agent, or Firm* — Kramer Amado, P.C.

(57) ABSTRACT

Disclosed is a method of identifying service topologies in a network, including determining a group of network devices having a same traffic identifier and indicating each network device of the group as not processed, selecting a first network device that is indicated as not processed in the group, indicating the selected first network device as partially processed, and associating the first network device with a service container identifier, identifying, for each port of the selected first network device, at least another network device in the group indicated as not processed connected to the first network device or a termination point, wherein the identified another network device is identified as partially processed and associated with the service container identifier, repeating step (c) for each identified another network device until only termination points are reached, wherein the identified another network device becomes the first network device in step (c), and when any network devices in the group of network devices remain not processed repeating the steps (b)-(d).

7 Claims, 4 Drawing Sheets

(56) References Cited

U.S. PATENT DOCUMENTS

| | | | |
|---|---|---|---|
| 2014/0098673 A1* | 4/2014 | Lee | H04L 45/64 370/238 |
| 2015/0010003 A1* | 1/2015 | Song | H04L 12/4654 370/392 |
| 2015/0319009 A1* | 11/2015 | Zhao | H04L 12/4641 370/392 |
| 2015/0319078 A1* | 11/2015 | Lee | H04L 12/6418 370/392 |
| 2015/0381531 A1* | 12/2015 | Huang | H04L 12/4645 370/401 |
| 2016/0036774 A1* | 2/2016 | Chong | H04L 45/02 370/392 |
| 2016/0134481 A1* | 5/2016 | Akiya | H04L 41/5058 709/224 |
| 2016/0315818 A1* | 10/2016 | Ebel | H04L 41/12 |
| 2017/0046374 A1* | 2/2017 | Fletcher | G06F 3/0484 |
| 2017/0099160 A1* | 4/2017 | Mithyantha | H04L 12/4641 |
| 2017/0111240 A1* | 4/2017 | Qin | H04L 29/08 |
| 2017/0272326 A1* | 9/2017 | Ravindran | H04L 41/12 |
| 2018/0083881 A1* | 3/2018 | Li | H04L 12/4662 |
| 2018/0136809 A1* | 5/2018 | Denneler | G06F 3/04817 |
| 2018/0212844 A1* | 7/2018 | Quinn | H04L 43/065 |

\* cited by examiner

LINEAR METHOD FOR DETECTION OF MULTIPLE SERVICE TOPOLOGIES

TECHNICAL FIELD

Various exemplary embodiments disclosed herein relate to the field of networking, and more specifically to the provision of tracing and probing functionality at the service topology layer of a network.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Rest of Summary section will track the claims when finalized.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
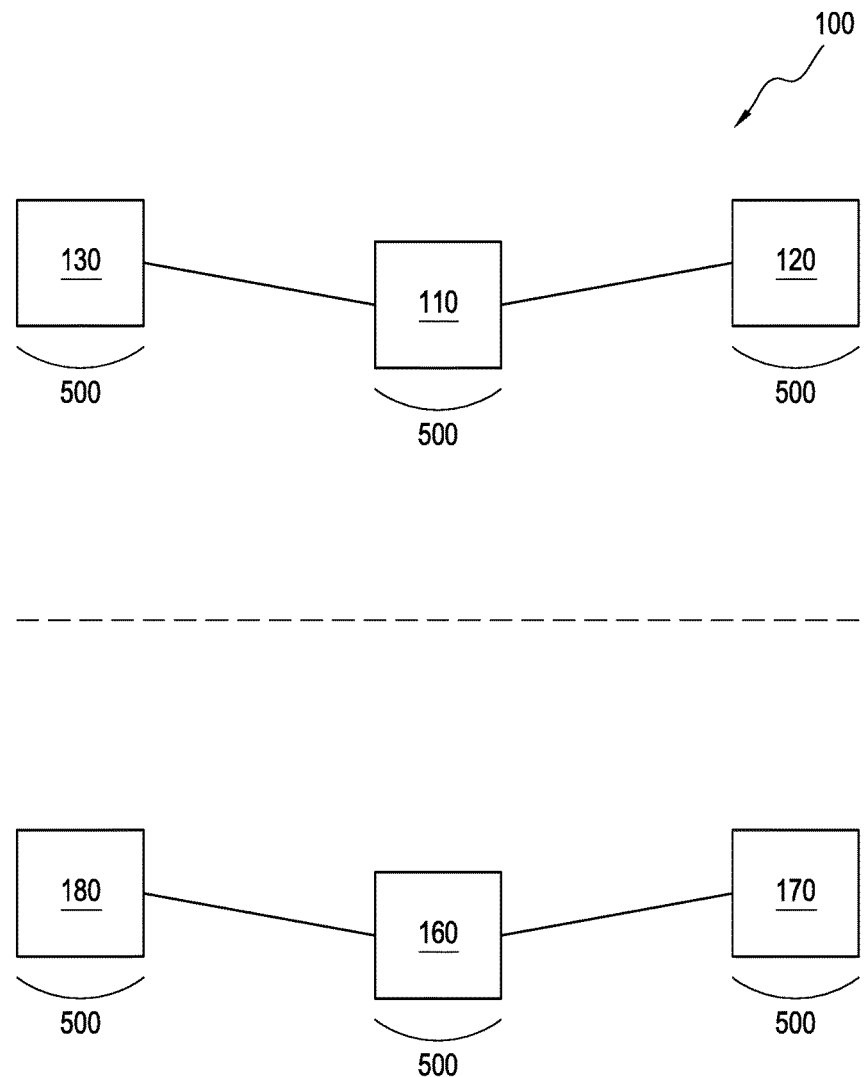
FIG. 1 illustrates a plurality of network connections in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Network operators may use a network management system to manage and allocate resources in a system. Many network elements may connect customers of a network operator to various networks. Various services on a network may be implemented using a virtual local area network (VLAN) such that traffic on the VLAN is identified by what is known as a virtual local area network identifier (VLAN ID). The VLAN ID is a traffic identifier that may be a way of tagging traffic so that a network device knows how to forward traffic based upon the VLAN ID associated with a packet. A network device may be any device that operates on a network such as a server, workstation, network printers, scanners, hubs, routers, and so on. The VLAN ID may be a 12-bit number, and as a result the number of VLAN IDs are limited. A specific VLAN ID may be associated with a specific network service. Network services may include any program, platform, application, software, etc. that is shared over a plurality of network devices and may include programs such as Facebook, Instagram, Yahoo, game programs, text editing programs, and so forth. Because the number of VLAN IDs is limited, many VLAN IDs may be re-used by various providers for different parts of their networks. Because networks can be vast, there may be significant repetiton of VLAN IDs that are unknown to network devices and to a network management system. A grouping of network devices and nodes that share a VLAN ID may be be called a container. VLAN IDs are also referred to herein as traffic identifiers.

Within a network, some network devices may not be aware of "end to end" services, services that extend beyond their immediate connection ports. The network devices may not have a global view, so to speak. The network devices may process network traffic based solely on traffic identifiers that are unique to a number of network devices that use the service. However, these traffic identifiers may be reused in different parts of the overall network, unbeknownst to the network devices.

Often when a network is set up or expanded, because there are a limited number of VLAN IDs, this multiplicity of use may bring confusion to a network manager that is attempting to identify elements on a network for service, new configurations, and other network functions.

Because of the reuse of VLAN IDs, there may be hundreds of network devices using services that have the same traffic identifiers. If a network management system or network operator desires to see an operational state of the system, such as if a customer is not getting traffic, a network management system or network manager could perform various steps. Identifying a problem point near a network device, a network management system or operator would diagnose a problem starting at the network device to determine the extent of the problem. When diagnosing the problem, the network devices are not able to know the extent of service traffic and traffic identifiers beyond their ports. Further, if the network manager would declare a service using a specific VLAN ID inoperable, it may encompass a separate properly operating service that happens to have the same VLAN ID. Accordingly, it is desirable for the network manager to be able to efficiently separate multiple separate services having the same VLAN ID.

FIG. 1 illustrates a plurality of network connections 100 in accordance with embodiments described herein. As illustrated in FIG. 1, a network device 110 may know that it is using traffic assigned to traffic ID 500, and may receive and transmit packets associated with traffic ID 500 to network devices 130 and 120. Network device 110 thus knows what services are sent and received from adjacent devices, but has no knowledge beyond that. For example, the network device 110 has no knowledge that network devices 160, 170, and 180 are also passing traffic with traffic identifier 500. If the network manager recognizes there is a problem at network device 110 and requests that all traffic with a traffic identifier 500 be disabled in the network, the network manager may inadvertently also shut down network devices 160-180 that implement a separate service, instead of only network devices affiliated with network devices 110-130.

For a network manager, it is desirable to differentiate between the multiple independent services within a network. This allows for independent management of each service, with respect to faults, performance/usage statistics, etc. Furthermore, it is desirable for the network management product or method to make that differentiation in an efficient manner, because large networks could otherwise cause this calculation to be runtime intensive.

Embodiments described herein include an ability to see a global picture and separate the various service containers based on service identification. As discussed above, embodiments described herein seek to alleviate a situation where there are multiple different services using a same traffic identifier, such that if a problem occurs in a first service, a network device may report that communication within the first service to be shut down or otherwise disabled. If this method is not used, when multiple different services share this same traffic identifier, additional services may reported as down (i.e. inoperational), thereby causing corrective actions to be unnecessarily taken by people and/or systems that are responsible for keeping the network operational, when no fault appears thereon.

Embodiments described herein may identify different network devices in different services by using a method including starting a service identification process at an arbitrary network device or node within a group of elements that use a same traffic identifier, and branch out to connecting nodes or devices until all the elements for a service are determined. If, after all elements have been determined that connect to the initial device or node and there still remain elements having the same traffic identifier, then the network management system will determine that there are multiple services using the same traffic identifier. The first service and the network nodes thereof will be identified and recorded. The network management system will proceed to a node or network device with the same traffic identifier that has not yet been tracked, and proceed with the steps of branching out to determine connections thereto. This method continues for different groups until all elements having same traffic identifiers can be arranged into different groups that represent different services. The network management system will store the identification information and topologies of the different services in different containers each having a container ID and be able to more successfully and efficiently diagnose and treat problems within a network.

Figure 2:
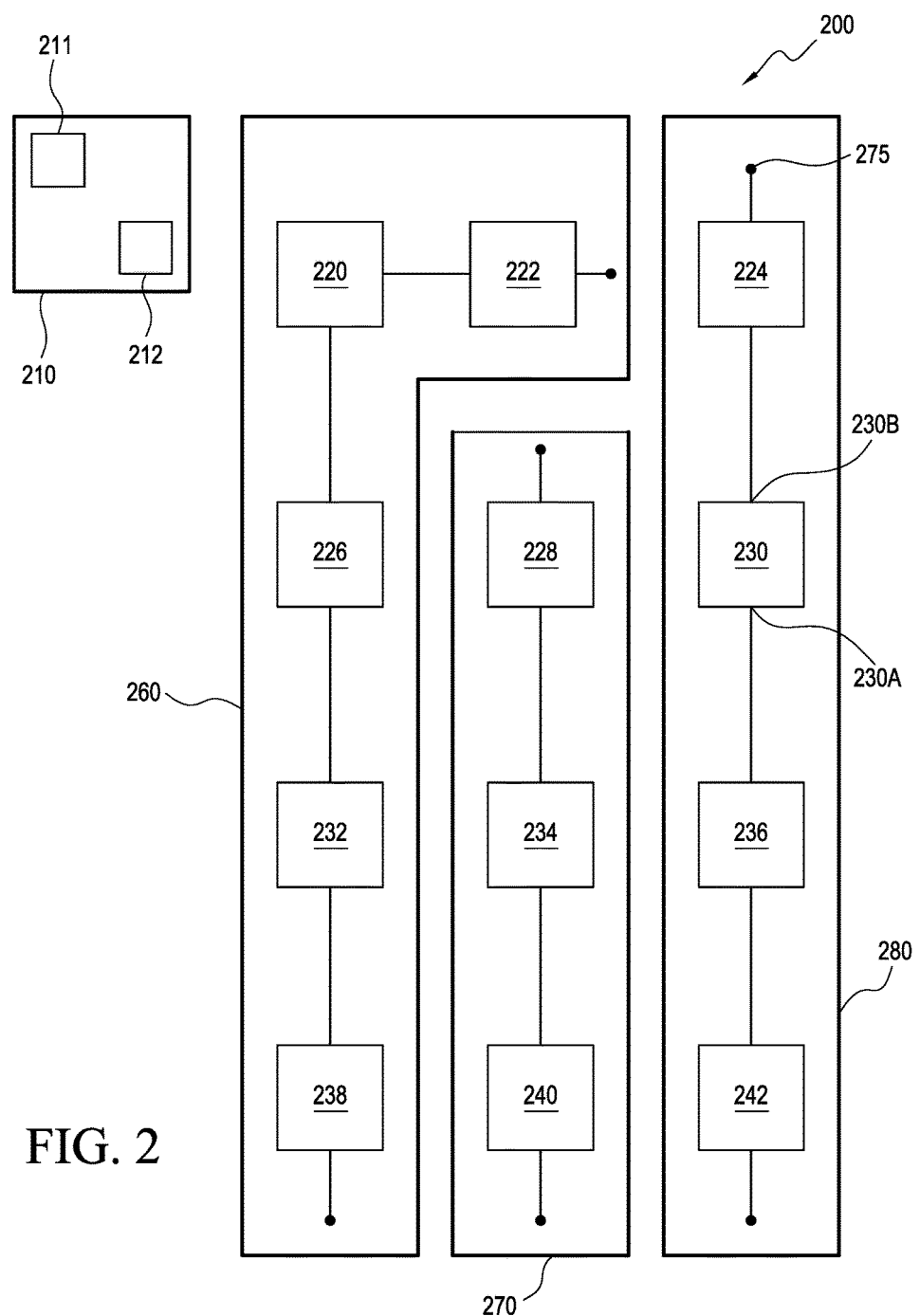
FIG. 2 illustrates a method of identifying different services having a same connection identifier in accordance with embodiments described herein.

FIG. 2 illustrates a layout of network devices 200 in accordance with embodiments described herein. As illustrated in FIG. 2, a network manager 210 having at least a processor 211 and memory 212 may control various aspects of a network system. As discussed herein, network devices in FIG. 2 may all have a same traffic identifier, yet be a part of different internet services. Initially, the network manager 210 may not identify the network devices 220, 222, 224, 226, 228, 230, 232, 234, 236, 238, 240, 242, and 242 as belonging to different services. After performing the method of identification described herein, the network manager 210 will be able to identify three separate services each having service containers 260, 270, and 280 that all use the same traffic identifiers and store that information in memory. The container size and number of network devices included therein are not limited to this example. In any system such as this, there may be hundreds or thousands of network devices to be categorized.

Figure 3:
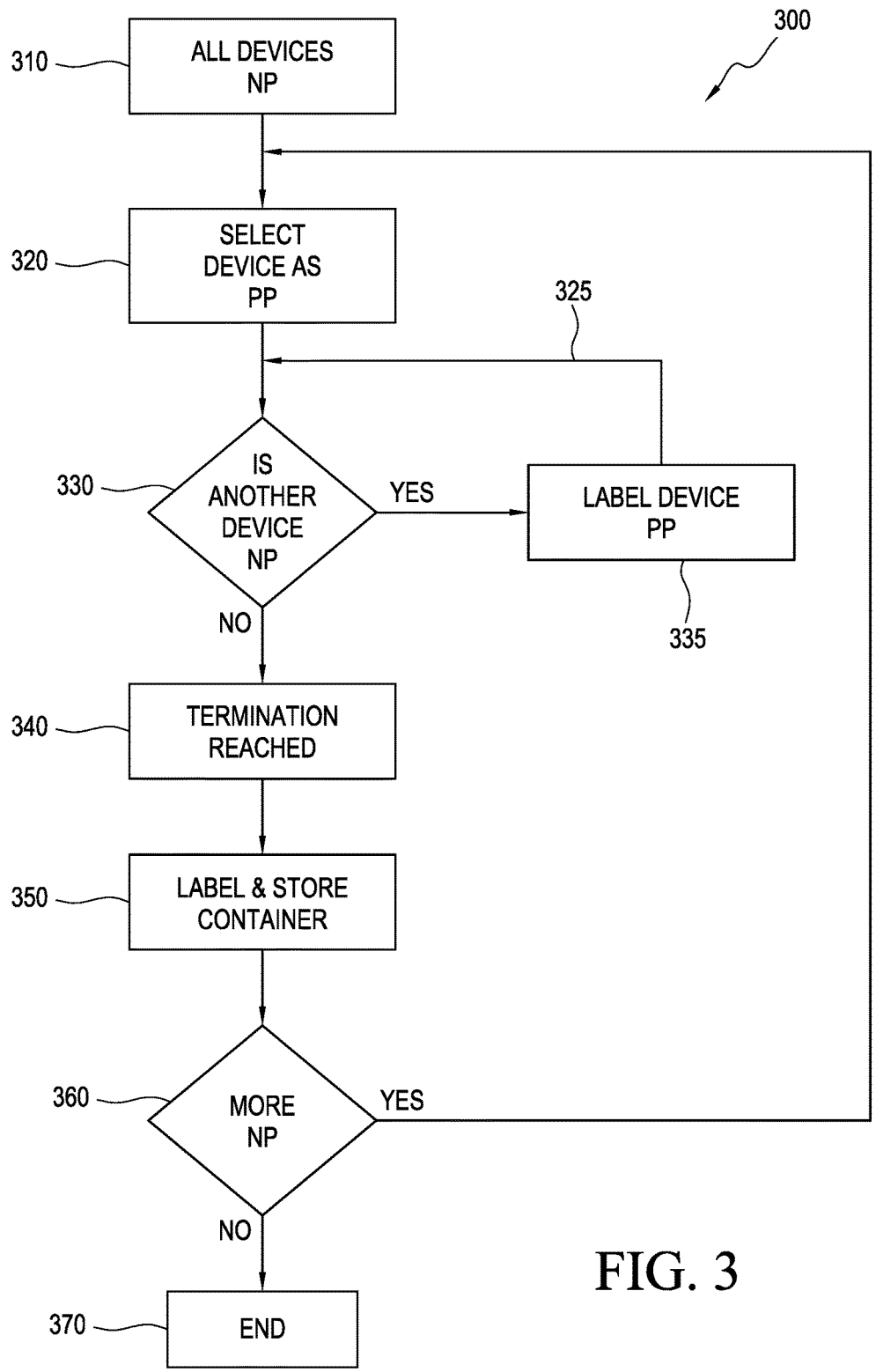
FIG. 3 illustrates a flow diagram of identifying different services having a same traffic identifier in accordance with embodiments described herein.

FIG. 3 illustrates a flow diagram 300 of identifying different services having a same traffic identifier in accordance with embodiments described herein. Referring to the components illustrated in FIG. 2, a method may begin with a set of network devices that are associated with a particular traffic identifier. In a first step 310, the network manager 210 may declare all of the network devices 220-242 to be in a first state labeled "not processed" or "NP" and assign them a NP label.

In a second step 320, the network manager 210 may select any of the network devices 220-242 as a starting point to identify a service that includes the selected network node having the traffic identifier. As soon as a network device is selected for evaluation, that network device moves from a "not processed" state to a second state called "partially processed" or "PP", as identified by the network manager 210.

Network devices may report to network management 210 the interfaces (e.g. physical ports, logical ports) that are associated with each traffic identifier. For example, network device 230 may have two ports 230A and 230B that are used to send and receive traffic for the specified traffic identifier. For each port associated with the traffic identifier in question on the selected network device, the network management system 210 may determine in a step 330 whether another network device in the "not processed" set is connected to the port. If YES, that network device, in this case network device 224, may be designated as "partially processed" or "PP" at step 335 and become a new PP starting point to map out a topology that will become the service container 280. This is illustrated in FIG. 3 in return loop 325 as the next PP network device looks for another next network device. As network device 230 has two end ports 230A and 230B, network connections will be traced in two different directions to determine the network devices associated with the traffic identifier.

Embodiments described herein are not limited to two ports. Network devices may have considerably more ports and the method described herein also applies to greater than two ports. Similarly, in the opposite direction using interface 230A, network device 236 will be designated "partially processed" and become another starting point to map out a topology for the container 280. When decision block 330 returns a NO and there are no more network devices connected to a previous network device, a termination point is reached at step 340, such as termination point 275, and the network manager will receive a signal from the network device 224 indicating the termination of the network service. In total, the network manager will continue to process each network device as "partially processed" until all of the network devices 224, 230, 236, and 242 are identified as being in the same service container 280. After each network device tests all the ports connected thereto, at step 350 the network device will transition from the "partially processed" state to a third state labeled "processed," and the network manager will store the "processed" network devices information in a memory thereof under a first container label.

When the "partially processed" set is empty and all the network devices connected to the initial network device have been labeled as "processed," the network manager 210 in step 360 will poll other devices in the network 200 having the same connection identifier to determine if any are still in the "not processed" state. If YES, then the network manager 210 will determine that there is at least one additional container having the same traffic identifier and loop back to step 320 to process all the network devices of that container. The network manager 210 will identify one of the "not processed" network devices, such as for example, network device 234 and repeat the same method as previously described to calculate another inter-connected set including identify "partially processed" network devices, termination points, and "processed" network devices, until the "not processed" set is empty and the process ends at 370.

An interconnected set of network devices associated with traffic identifier may be known as a service container as discussed herein or as a topology. Each service container represents an independent service, separate from the other inter-connected sets network devices associated with other services. After the individual service topologies have been identified, a network manager or network management system may independently monitor the service's operational states and correctly determine the effects of a service going down without incorrectly reporting that other services with the same traffic identifier are down.

Figure 4:
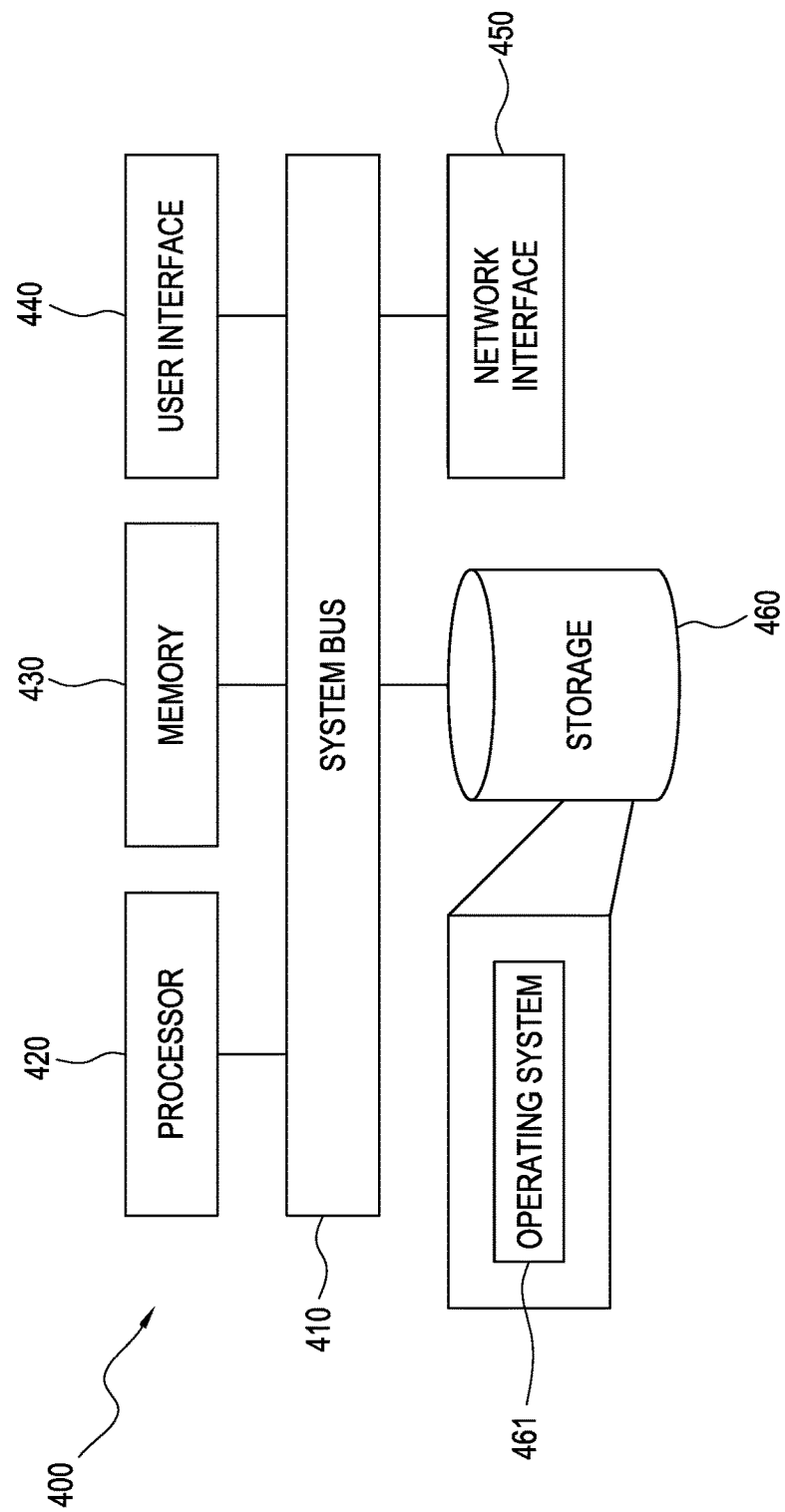
FIG. 4 illustrates an exemplary hardware diagram configured to implement a network manager in accordance with embodiments described herein.

FIG. 4 illustrates an exemplary hardware diagram 400 for implementing a processor of a network manager configured to identify service topologies in a network. The exemplary hardware 400 may correspond to one or more processors 211 and memory 212 within the network manager 210 of FIG. 2. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a mouse, and a keyboard for receiving user commands. In some embodiments, the user interface 440 may include a command line interface or graphical user interface that may be presented to a remote terminal via the network interface 450.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store a base operating system 461 for controlling various basic operations of the hardware 400.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

While the host device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A method of identifying service topologies in a network, comprising:
   (a) determining a group of network devices having a same traffic identifier and indicating each network device of the group as not processed;
   (b) selecting a first network device that is indicated as not processed in the group, indicating the selected first network device as partially processed, and associating the selected first network device with a service container identifier;
   (c) identifying, for each port of the selected first network device, another network device in the group indicated as not processed connected to the selected first network device or a termination point, wherein the identified another network device is identified as partially processed and associated with the service container identifier;
   (d) repeating step (c) for each identified another network device until only the termination point is reached, wherein the identified another network device becomes the first network device in step (c);
   (e) when any network devices in the group of network devices remain not processed repeating the steps (b)-(d); and
   identifying each network device as processed after testing all ports connected to each network device and storing information for all of the processed network devices under a first container label.

2. The method of claim 1, wherein, when only the termination point is reached, categorizing a first group of network devices having the same traffic identifier as a first service container.

3. The method of claim 2, wherein when steps (b)-(d) are repeated, categorizing a second group of network devices having the same traffic identifier as a second service container.

4. A method of classifying topologies in a network, comprising:
   selecting a group of network nodes associated with a traffic identifier, each node having at least one branch to another node;
   selecting a starting point node;
   tracing at least one branch from the starting point node to nodes connected to the starting point node by the respective at least one branches;
   when a second node is reached, establishing the second node as an additional starting point node;
   when the second node is not reached, establishing a termination point of a first topology;
   branching out to additional nodes until a plurality of termination points have been reached;
   searching the system for another topology;
   when another topology is found that is not connected to the first typology, registering that there are multiple topologies using the same traffic identifier, labeling the first typology, and mapping the second typology as a second typology with the same number; and
   identifying each network device as processed after testing all ports connected to each network device and storing information for all of the processed network devices under a first container label.

5. A network manager configured to identify service topologies in a network, comprising:
   a network interface;
   a memory device; and
   a processor in communication with the interface memory device, the processor being configured to determine a group of network devices having a same traffic identifier and indicating each network device of the group as not processed, select a first network device that is indicated as not processed in the group, indicate the selected first network device as partially processed, and associate the first network device with a first service container identifier, identify, for each port of the selected first network device, another network device in the group indicated as not processed connected to the selected first network device or a termination point, wherein the identified another network device is identified as partially processed and associated with the first service container identifier; repeat step (c) for each identified another network device until only the termination point is reached, wherein the identified another network device becomes the first network device in step (c), and when any network devices in the group of network devices remain not processed repeat the steps (b)-(d), and identify each network device as processed after testing all ports connected to each network device and storing information for all of the processed network devices under a first container label.

6. The network manager of claim 5, wherein when the processor determines that only the termination point is reached, categorizing a first group of network devices having the same traffic identifier as a first service container.

7. The network manager of claim 6, wherein when the processor determines that steps (b)-(d) are repeated, categorizing a second group of network devices having the same traffic identifier as a second service container.

* * * * *